United States Patent Office 3,551,491
Patented Dec. 29, 1970

3,551,491
4 - HALOTHYMYL - [N - ETHYL - N - β - CHLOROETHYL - 1- AND-2 - AMINO PROPYL(2) AND (1)] ETHER AND SALTS THEREOF
Gerhard Renwanz, Karl Credner, and Berthold Geisel, Berlin, and Hermann Engelhard, Gottingen, Germany, assignors to Diwag Chemische Fabriken G.m.b.H., Berlin, Germany, a corporation
No Drawing. Continuation of application Ser. No. 327,172, Nov. 27, 1963. This application Feb. 16, 1967, Ser. No. 617,417
Claims priority, application Germany, Nov. 28, 1962, D 40,371
Int. Cl. C07c 93/06
U.S. Cl. 260—570.7
3 Claims

ABSTRACT OF THE DISCLOSURE

Thymyl ethers of the formula

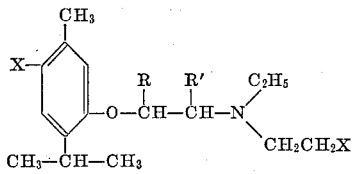

or acid addition salts thereof wherein at least one R or R' is methyl and the other is hydrogen. These compounds have improved sympathicolytic activity and reduced toxicity as compared to their non-methyl substituted homologs.

---

This application is a continuation of application Ser. No. 327,172, filed Nov. 27, 1963, now abandoned.

This invention relates to a process for preparing basic thymyl ethers.

A process for preparing basic thymyl ethers of the general formula

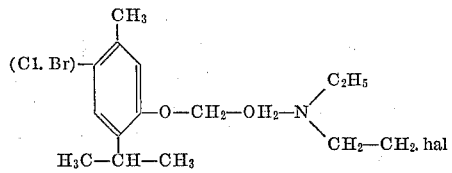

was already proposed. The compounds are characterized by sympathicolytic-adrenolytic characteristics. Doses of 0.5 mg./kg. effect adrenaline reversal on blood pressure of cats and diminution or elimination of noradrenaline action on blood pressure. The action lasts 8 hours and more.

It has now been found that the introduction of a lateral methyl group at the ethylene bridge between the oxygen and nitrogen atoms results in a reduction of toxicity to a surprising extent while the sympatholytical action is fully retained or enhanced. The compounds of this invention are pharmaceutical products which have a large therapeutic ratio which has never been reached up to the present in this class of chemical substances.

For example, the following values were obtained for 4-chlorothymyl ethers of the following formula:

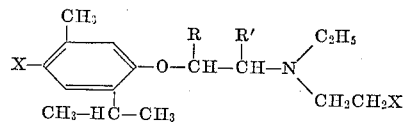

| | R | R' | Toxicity sc. on mice, mg./kg. | Minimum dose for adrenaline reversal on blood pressure of cats, mg./kg. | Therapeutic ratio | Relative therapeutic ratio |
|---|---|---|---|---|---|---|
| Compound: | | | | | | |
| WV 781 | H | H | 105 | 1.0 | 105 | 1 |
| WV 0052 | CH₃ | H | 210 | 0.5 | 420 | 4 |
| WV 0062 | H | CH₃ | 130 | 0.35 | 370 | 3.5 |

As may be seen from the table, introduction of a lateral methyl group in adjacency to oxygen reduces toxicity to one half and doubles the sympathicolytic activity. Thus, the therapeutic ratio is enhanced to four times its initial level. The effect of introducing a lateral methyl group in adjacency to nitrogen is also surprising: The toxicity is diminished and the sympathicolytic activity increased.

These results represent a further progress in therapy of hypertension and disturbed peripheral blood circulation.

The new compounds can be prepared by coupling 4-halogeno-thymol-sodium with the corresponding ethyl-chloro-propyl-benzylamine and subsequently exchanging the benzyl group for the β-chloroethyl group by hydrogenation, addition of ethylene oxide and hydrochlorination. As an alternative, ethylamino-propyl chloride may be used for coupling with 4-chlorothymol sodium and the reaction product reacted with ethylene oxide and subsequently with thionyl chloride.

Another method starts from 4-chlorothymyl-hydroxy-propyl ether which may be prepared from chlorothymol and propylene oxide or from clorothymol sodium and chloropropanol. The hydroxypropyl ether is subsequently hydrochlorinated and further reacted with ethylamino ethanol and thionyl chloride.

When using thionyl chloride as described above, the processes mentioned above give the β-chloroethyl compounds. The β-bromoethyl compounds can be prepared by either using thionyl bromide in place of thionyl chloride or by reacting the β-chloroethyl compounds with sodium bromide in alcohol or with lithium bromide in acetone.

The hydrochlorides of the new compounds can be converted in conventional manner into salts of other acids, e.g. into hydrobromides, 1,5-naphthalene disulfonates, maleinates and others. The organic base is either liberated with alkali, taken up in a suitable organic solvent and neutralized with the acid desired, or, in case of suitable solubility conditions, the hydrochloride is reacted with the alkali metal salt or silver salt of the acid desired.

The following examples are given by way of illustration and not limitation.

EXAMPLE 1

(a) 4-chlorothymyl-[N-ethyl-N-benzyl-amino-propyl-(2)]-ether-naphthalene-disulfonate-1,5

The calculated amount of ethyl(2-chloropropyl)-benzylamine is slowly added to a boiling solution of 4-chlorothymol-sodium in ethanol and the mixture is kept boiling for several hours. The reaction mixture is freed from the solvent under vacuum, taken up with acetic ester and filtered. The filtrate is neutralized with ethanolic naphthalene disulfonic acid-1,5 and placed on ice for crystallization. M.P. 245° C. with decomposition.

(b) 4-chlorothymyl-[N-ethyl-amino-propyl-(2)]-ether hydrochloride

Debenzylation may be effected with the use of a solution of the base in 50% ethanol, prepared from the compound (a) and alkali. Hydrogenation takes place in the presence of palladium-carbon at as low as room temperature and atmospheric pressure. The catalyst is then removed by filtration, the filtrate acidified with hydrochloric acid, concentrated by evaporation, and the raw product recrystallized from acetic ester. M.P. 126–128° C.

(c) 4-chlorothymyl-[N-ethyl-N-β-hydroxyethyl amino-propyl-(2)]-ether hydrochloride The compound (b) is heated for 2 hours at 80° C. with slightly more than the theoretical amount of ethylene oxide and isopropanol in a pressure tube. This is followed by driving off the solvent, taking up the residue in acetic ester, acidifying with hydrogen chloride and allowing to stand for crystallization after addition of ether. M.P. 115–116° C.

(d) 4-chlorothymyl-[N-ethyl-N-β-chloroethyl-amino-propyl-(2)]-ether hydrochloride The compound (c), with thionyl chloride and benzene as the solvent, is heated to boiling for about 30 minutes. After having distilled off the benzene and excess thionyl chloride, the reaction mixture gives an oil which, by dissolution in acetic ester and precepitation with ether, gives the compound

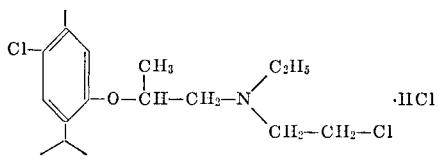

as a white crystalline powder having a melting point of 123–124° C.

The same process gives the isomeric compound WV 0062 when using ethyl-(1-chloro-propyl-2)-benzylamine as the starting product.

(e) 4-chlorothymyl-[N-ethyl-N-β-chloroethyl-amino-propyl-(2)]-ether-citrate 8 grams of the base liberated from the compound (d) with potassium carbonate are dissolved in 20 cc. of alcohol and neutralized with a 20% alcoholic citric acid. The citrate crystallizes on standing on ice. M.P. 135–136° C. with decomposition.

EXAMPLE 2

(a) 4-chlorothymyl-[N-ethyl-amino-isopropyl-(1)]-ether-hydrochloride

A mixture of 12.2 g. of 1-chloro-2-(ethyl-amino)-propane and 200 ml. of benzene is added dropwise within 30 minutes ot a boiling solution of 0.1 mole of 4-chlorothymol sodium in 150 ml. of isopropanol. Thereafter, the mixture is stirred for 6 hours with reflux. After removal of the precipitated sodium chloride by suction filtration, the solvents are evaporated under vacuum. The residue is taken up with acetic ester, repeatedly washed with water to remove by-products, dried over MgSO₄, mixed with alcoholic hydrochloric acid, and allowed to stand for crystallization. M.P. 124–125° C.

(b) 4-chloro-thymyl-[N-ethyl-N-β-hydroxyethyl-amino-isopropyl-(1)]-ether hydrochloride The compound (a) is reacted with a solution of ethylene oxide in ethanol at 100° C. in an autoclave using the procedure of Example 1(c). The hydrochloride melts at 117–118° C.

(c) 4-chlorothymyl-[N-ethyl-N-β-chloroethyl-amino-isopropyl-(1)]-ether hydrochloride The compound (b) is reacted with the equivalent amount of thionyl chloride by the procedure of Example 1(d) to give the chloroethyl compound. M.P. 124–125° C.

EXAMPLE 3

(a) (2-hydroxy-propyl-1)-(4-chlorothymyl)-ether

A boiling solution of 4-chlorothymol-sodium in ethanol is slowly mixed with a solution of the calculated amount of 1-chloropropanol-2 in ethanol. This is followed by boiling for several hours, removal of precipitated sodium chloride by filtration, removal of the alcohol by distillation, and fractional distillation of the residue. M.P. 126–128° C.

(b) (2-chloropropyl-1)-(4-chlorothymyl)-ether

A solution of the compound (a) in an about equimolar amount of pyridine is mixed at room temperature with a slight excess of thionyl chloride while stirring. After the reaction has slowed down, the mixture is heated to 100° C. Fractional distillation of the reaction mixture gives the compound (b) B.P. 127° C. at 1 mm. Hg.

(c) (4-chlorothymyl)-[N-ethyl-N-β-hydroxyethyl-amino-isopropyl-(1)]-ether hydrochloride The compound (b) is heated with about the same amount of ethylamino ethanol for 6 hours at 160° C. and the compound (c) is isolated as hydrochloride from the solution in acetic ester. M.P. 114–116° C.

(d) (4-chlorothymyl)-[N-ethyl-N-β-chloroethyl-amino-isopropyl-(1)]-ether hydrochloride Reaction of (c) with thionyl chloride takes place in the same manner as described in Example 1(d) and gives the compound

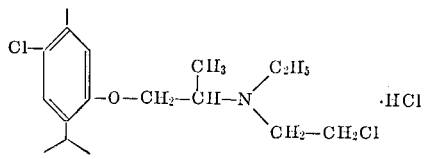

M.P. 124–125° C.

The same procedure gives the isomeric compound WV 0052 when using 2-chloropropanol as the starting material.

(e) 4-chlorothymyl-[N-ethyl-N-β-chloroethyl-amino-isopropyl-(1)]-ether-naphthalene-1,5-disulfonate An aqueous solution of the compound (d) is mixed with saturated aqueous naphthalene-1,5-disulfonic acid. The naphthalene disulfonate is obtained in an almost quantitative yield. M.P. 198–200° C.

We claim:

1. A member of the group consisting of hydrochloride salts of compounds having the formula

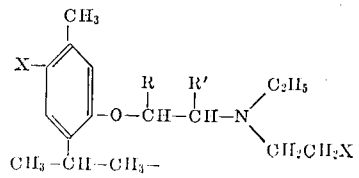

wherein R and R' are each members selected from the group consisting of hydrogen and methyl, one of R and R' being hydrogen and the other methyl and X is a member of the group consisting of chlorine and bromine.

2. 4 - chlorothymyl-[N-ethyl-N-β-chloroethyl-1-aminopropyl (2)]-ether-hydrochloride.

3. 4 - chlorothymyl-[N-ethyl-N-β-chloroethyl-2-aminopropyl (1)]-ether hydrochloride.

References Cited

UNITED STATES PATENTS

| | | | |
|---|---|---|---|
| 1,543,287 | 6/1925 | Hahl | 260—570.7 |
| 2,298,630 | 10/1942 | Shelton | 260—570.8 |
| 1,949,046 | 2/1934 | Hartmann et al. | 260—570.7 |
| 2,495,772 | 1/1950 | Rieveschl et al. | 260—570.7 |
| 2,599,000 | 6/1952 | Kerwin et al. | 260—570.7 |
| 2,668,813 | 2/1954 | Goldberg et al. | 260—570.7X |
| 2,683,719 | 7/1954 | Kerwin et al. | 260—570.7X |
| 2,691,042 | 10/1954 | Turner et al. | 260—570.7 |
| 2,858,312 | 10/1958 | Olin | 260—570.7X |
| 3,105,854 | 10/1963 | Druey et al. | 260—570.7 |
| 3,121,724 | 2/1964 | Shapiro et al. | 260—570.7X |
| 3,927,924 | 3/1960 | Mills | 260—570.8 |
| 3,081,336 | 3/1963 | Kaiser et al. | 260—570.5X |
| 3,118,941 | 1/1964 | Swett et al. | 260—570.5 |
| 3,341,572 | 9/1967 | Engelhard et al. | 260—570.7X |

FOREIGN PATENTS

| | | | |
|---|---|---|---|
| 905,738 | 11/1954 | Germany | 260—570.7 |

OTHER REFERENCES

Van Dijk et al.: Recueil Des Travaus Chim. Des Pays-Bas, vol. 78, pp. 22–42 (1959).

Wagner et al.: Synthetic Organic Chemistry, pp. 93–94 (1953).

English et al.: Principles of Organic Chemistry, 2d ed., p. 172 (1956).

Wickerson et al.: "Jour. Pharmacology and Experimental Therapeutics," vol. 101, pp. 379–87 and 392–96 (1951).

Wheatley et al.: "Jour. Amer. Chem. Soc.," vol. 72, pp. 1655–59 (1950).

ROBERT V. HINES, Primary Examiner

U.S. Cl. X.R.

260—501.17, 501.19, 570.8, 612, 623; 424—330